(12) United States Patent
Chien et al.

(10) Patent No.: US 11,887,476 B2
(45) Date of Patent: Jan. 30, 2024

(54) EMERGENCY SERVICE VEHICLE NOTIFICATION AND ACKNOWLEDGEMENT

(71) Applicant: AT&T Intellectual Property I, L.P., Atlanta, GA (US)

(72) Inventors: Ginger Chien, Bellevue, WA (US); Zhi Cui, Sugar Hill, GA (US); Eric Zavesky, Austin, TX (US); Robert T. Moton, Jr., Alpharetta, GA (US); Adrianne Binh Luu, Atlanta, GA (US); Robert Koch, Peachtree Corners, GA (US)

(73) Assignee: AT&T Intellect al Property I, L.P., Atlanta, GA (US)

( * ) Notice: Subject to any disclaimer, the term of this patent is extended or adjusted under 35 U.S.C. 154(b) by 170 days.

(21) Appl. No.: 17/505,791

(22) Filed: Oct. 20, 2021

(65) Prior Publication Data

US 2023/0124536 A1 Apr. 20, 2023

(51) Int. Cl.
*G08G 1/0965* (2006.01)
*H04W 4/029* (2018.01)
*H04W 4/90* (2018.01)
*G08G 1/00* (2006.01)
*H04W 4/40* (2018.01)

(52) U.S. Cl.
CPC ........... *G08G 1/0965* (2013.01); *G08G 1/20* (2013.01); *H04W 4/029* (2018.02); *H04W 4/90* (2018.02); *H04W 4/40* (2018.02)

(58) Field of Classification Search
CPC .............................. G08G 1/0965; H04W 4/40
USPC ....................................................... 455/404.2
See application file for complete search history.

(56) References Cited

U.S. PATENT DOCUMENTS

| | | | | |
|---|---|---|---|---|
| 2002/0102961 | A1* | 8/2002 | Gibbons | G08G 1/0965 455/70 |
| 2004/0189490 | A1* | 9/2004 | Halishak | G08G 1/0965 340/902 |
| 2014/0310702 | A1* | 10/2014 | Ricci | G06Q 20/321 717/173 |
| 2015/0061895 | A1* | 3/2015 | Ricci | B60K 28/00 340/902 |
| 2018/0295481 | A1* | 10/2018 | Kahtava | H04W 52/0219 |
| 2019/0159237 | A1* | 5/2019 | Wei | H04W 74/0866 |

OTHER PUBLICATIONS

Munzer, B.W., et al. "Augmented Reality in Emergency Medicine: A Scoping Review", Journal of Medical Internet Research, Apr. 2019, 21 (4):e12368, doi:1032196/12368, 14 pages.

(Continued)

*Primary Examiner* — Qutbuddin Ghulamali (57) ABSTRACT

A processing system including at least one processor may transmit a notification of a presence of an emergency service vehicle to a plurality of entities, obtain, from at least a first entity of the plurality of entities, at least a first acknowledgement of the presence of the emergency service vehicle, determine that at least a second acknowledgement is not obtained from at least a second entity of the plurality of entities, and present information associated with the at least the second entity to a device of the emergency service vehicle.

20 Claims, 4 Drawing Sheets

(56) References Cited

OTHER PUBLICATIONS

Carney, D., "Protecting First Responders From Autonomous Vehicles", DesignNews, Nov. 9, 2021, accessed from https://www.designnews.com/automotive-engineering/protecting-first-responders-autonomous-vehicles.

Globalautomakers, "FTC and NHTSA Workshop on Privacy and Security Issues Related to Connected and Automated Vehicles" Connected Cars Workshop and P175403, May 2017, downloaded from https://www.ftc.gov/system/files/documents/public_comments/2017/05/00041-140624.pdf, on Mar. 8, 2022.

* cited by examiner

EMERGENCY SERVICE VEHICLE NOTIFICATION AND ACKNOWLEDGEMENT

The present disclosure relates generally to network-connected vehicle operations, and more particularly to methods, computer-readable media, and apparatuses for presenting to an operator of an emergency service vehicle information associated with an entity notified of a presence of the emergency service vehicle.

BACKGROUND

Current trends in wireless technology are leading towards a future where virtually any object can be network-enabled and addressable on-network. The pervasive presence of cellular and non-cellular wireless networks, including fixed, ad-hoc, and/or or peer-to-peer wireless networks, satellite networks, and the like along with the migration to a 128-bit IPv6-based address space provides the tools and resources for the paradigm of the Internet of Things (IoT) to become a reality. In addition, autonomous vehicles are increasingly being utilized for a variety of commercial and other useful tasks, such as package deliveries, search and rescue, mapping, surveying, and so forth, enabled at least in part by these wireless communication technologies.

SUMMARY

In one example, the present disclosure describes a method, computer-readable medium, and apparatus for presenting to an operator of an emergency service vehicle information associated with an entity notified of a presence of the emergency service vehicle. For example, a processing system including at least one processor may transmit a notification of a presence of an emergency service vehicle to a plurality of entities, obtain, from at least a first entity of the plurality of entities, at least a first acknowledgement of the presence of the emergency service vehicle, determine that at least a second acknowledgement is not obtained from at least a second entity of the plurality of entities, and present information associated with the at least the second entity to a device of the emergency service vehicle.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Examples of the present disclosure describe methods, computer-readable media, and apparatuses for presenting to an operator of an emergency service vehicle information associated with an entity notified of a presence of the emergency service vehicle. For instance, examples of the present disclosure may enable the communication of awareness levels about and between two entities, such as people or vehicles. In one example, the entities need not have prior knowledge of each other's identity or addresses for direct communications. In particular, the present disclosure provides for an emergency service vehicle, and an operator thereof, to have a level of awareness of other entities within the vicinity of the emergency service vehicle, and for the other entities to have an opportunity to also be made aware of the presence of the emergency service vehicle. To illustrate, in one example, an emergency service vehicle may announce its presence via wireless communication(s) transmitted to the other entities or devices thereof. In one example, the other entities may provide acknowledgements and/or may briefly communicate with the emergency service vehicle and/or an operator thereof. It should again be noted that in one example, the entities may have no knowledge of one another's identities, nor a previously-established means to communicate. The entities may include a non-autonomous vehicle (and/or an operator or other person therein), an autonomous vehicle (and/or a person therein), a pedestrian, a cyclist, and so forth.

In an illustrative example, there may exist one or more entities within a vicinity of an emergency service vehicle (e.g., while the emergency service vehicle is engaged in an emergency task, such as en route to the location of a fire, a traffic accident, etc., while en route to a hospital, and so forth). Each entity may be either natively defined as a device with communication and sensing capabilities—such as an autonomous vehicle, or may be enabled by a device with those capabilities, such as a person equipped with a smart phone or other mobile computing devices. For instance, entities may include a non-autonomous vehicle driven by driver, a pedestrian equipped with a smart phone, a non-autonomous motorcycle, an autonomous vehicle, and so forth.

Each entity may have wireless network communication capabilities. Each entity may also have location awareness and other sensing capabilities such as motion detection, radar, light detection and ranging (LiDAR), audio detection via microphones, cameras to detect and capture images or video, and so forth. Each entity may also have the capability for a presentation of information via a speaker or for visual presentation such as via a screen, an augmented reality (AR) display, or the like. Each entity may also have the capability for receiving user commands, such as speech commands via a microphone, touch input via a touchscreen, etc. In one example, an entity (or computing device being used by an entity) may also be equipped with logic to interpret gestures, such as may be detected and received via a camera. In one example, each entity may register with an entity database, thereby creating an entity record in the database. The entity record may also contain data describing any conditions that may enhance or impair an entity's ability to sense and communicate awareness with other entities. For example, if a driver has decreased vision at night or if a pedestrian has difficulty hearing, this may be included in the entity record in the entity database. Further, in one example, each entity's location may be updated and recorded in the entity database on an ongoing basis.

In one example, upon the detection of an encounter between an emergency service vehicle and an entity, a record of the encounter may be made in the encounter database. In doing so, an awareness level may be recorded. Awareness levels may be defined as various degrees of awareness between the emergency service vehicle and the entity. Also upon detection of the encounter, a server may initiate the creation of a communication session between the entities. This may be, for example, the creation of a connection via Wi-Fi or other local wireless networks, via a cellular network, and so forth. In one example, a first awareness level may be determined, e.g., indicating that the emergency service vehicle and an entity are in a defined proximity of one another.

Next, a second awareness level may be detected, e.g., a sensed-presence awareness. For instance, this awareness level may indicate that at least one of the emergency service vehicle or the entity has the ability to sense the presence of the other, for example, either visually, or by other means. This may not necessarily indicate that an awareness exist between two drivers, or between a driver and a pedestrian, for example—only that the awareness may exist, e.g., within a line of sight. For instance, a driver may be in a location where the driver is able to see the pedestrian, but may not actually see the pedestrian if the driver is not specifically looking in the correct direction. In one example, sensors may be used to determine whether the entities are able to sense each other's presence. For example, a driver may have a dashboard camera (dashcam) or head-mounted camera (e.g., of an AR headset) that may be used to confirm that the pedestrian is within the field-of-view of the driver. Similarly, other types of sensors such as radar, sonar, LiDAR, or the like may be used to make this determination.

A next level of awareness may include having at least one-party acknowledged its awareness. For instance, this awareness level may indicate that an entity is specifically aware of an emergency service vehicle. For instance, detection of the emergency service vehicle (via sensors associated with the first entity, via notification from a network-based server, etc.) may be presented to an entity via a visual display, via audio announcement, or the like. The entity, may then provide or obtain a user input, such as a voice acknowledgement, a touch input, etc. confirming that the entity is presently aware of the emergency service vehicle. In one example, the entity's acknowledgement may be forwarded or otherwise notified to the emergency service vehicle for presentation to an operator (e.g., a driver, an emergency service personnel in a passenger seat, etc.).

In one example, it may optionally be determined to establish a two-way communication of awareness between an emergency service vehicle and an entity (e.g., where the entity comprises a human, or the human is an operator, passenger, or the like, e.g., a driver of a non-autonomous vehicle). This may be based on data in the entity database, such as the limitation(s) of the entity. For instance, if a pedestrian has limited peripheral vision, it may be beneficial to establish communication of awareness between the pedestrian and the emergency service vehicle. In one example, an alert may be presented to an operator of the emergency service vehicle as a prompt for awareness acknowledgement. Communication addresses, e.g., IP addresses, for both the entity and the emergency service vehicle may have been stored in an entity database and therefore also in an encounter database.

In one example, a server may establish a temporary communication path between the entity and the emergency service vehicle. This temporary connection may be an open connection, such as a voice connection, or it may be transactional, such as a messaging connection. For example, upon receiving the alert of the pedestrian with special needs, an operator of the emergency service vehicle may respond via a speech input, such as "I see you." At this point, a "level three" awareness may exist. The input from the operator may be received by the server and translated to a text message to the pedestrian based on the pedestrian's preferences. In one example, a virtual assistant may also be configured to read out the text message for the pedestrian. In another example, such a temporary communication path may be established directly between the emergency service vehicle and the entity (e.g., via peer-to-peer wireless communication, via a cellular sidelink, or otherwise without involvement of the server).

A fourth level of awareness may comprise a two-party acknowledged awareness. For instance, this awareness level may indicate that both the emergency service vehicle (e.g., an operator thereof) and the entity are presently aware of each other. To illustrate, a spoken message from the operator of the emergency service vehicle may be presented to a pedestrian. The pedestrian may then respond verbally or via other inputs to complete the communication, e.g., directing his or her gaze in the direction of the approaching emergency service vehicle. In one example, the response/acknowledgement may be received by a server or a processing system of the emergency service vehicle, and translated into a response that is presented to the operator. In one example, upon achieving the fourth level awareness the encounter may end. Alternatively, a server may remain in a communication path as a translator of anonymous communications for the period of time for which the emergency service vehicle and the entity remain in proximity of one another. Thereafter, the encounter may be declared to have ended.

Examples of the present disclosure may also apply to other types of entities. For example, an encounter may exist between an emergency service vehicle and a non-autonomous vehicle in which a driver is also not in possession of a smartphone or other mobile computing devices, between an emergency service vehicle and a pedestrian or cyclist without a mobile computing device, between an emergency service vehicle and an animal, and so forth. In this case, the entity may be detected and information may be presented to the operator of the emergency service vehicle indicating that there is an entity for which acknowledgement of awareness cannot be obtained.

Although the present disclosure is discussed below in the context of exemplary dedicated short range communication (DSRC) networks and cellular access networks, the present disclosure is not so limited. Namely, the present disclosure can be applied to various types of communication networks using various types of communication protocols, e.g., a combination of any one or more of: wired and wireless local area network (LANs), wide area networks (WANs), various types of cellular networks, e.g., general packet radio service (GPRS) networks, uniform terrestrial radio access networks (UTRANs), Global System for Mobile Communications (GSM) networks, Long Term Evolution (LTE) networks, Fifth Generation (5G) networks, and the like, satellite networks, the Internet in general and so forth. Thus, these and other aspects of the present disclosure as discussed in greater detail below in connection with the examples of FIGS. 1-4.

Figure 1:
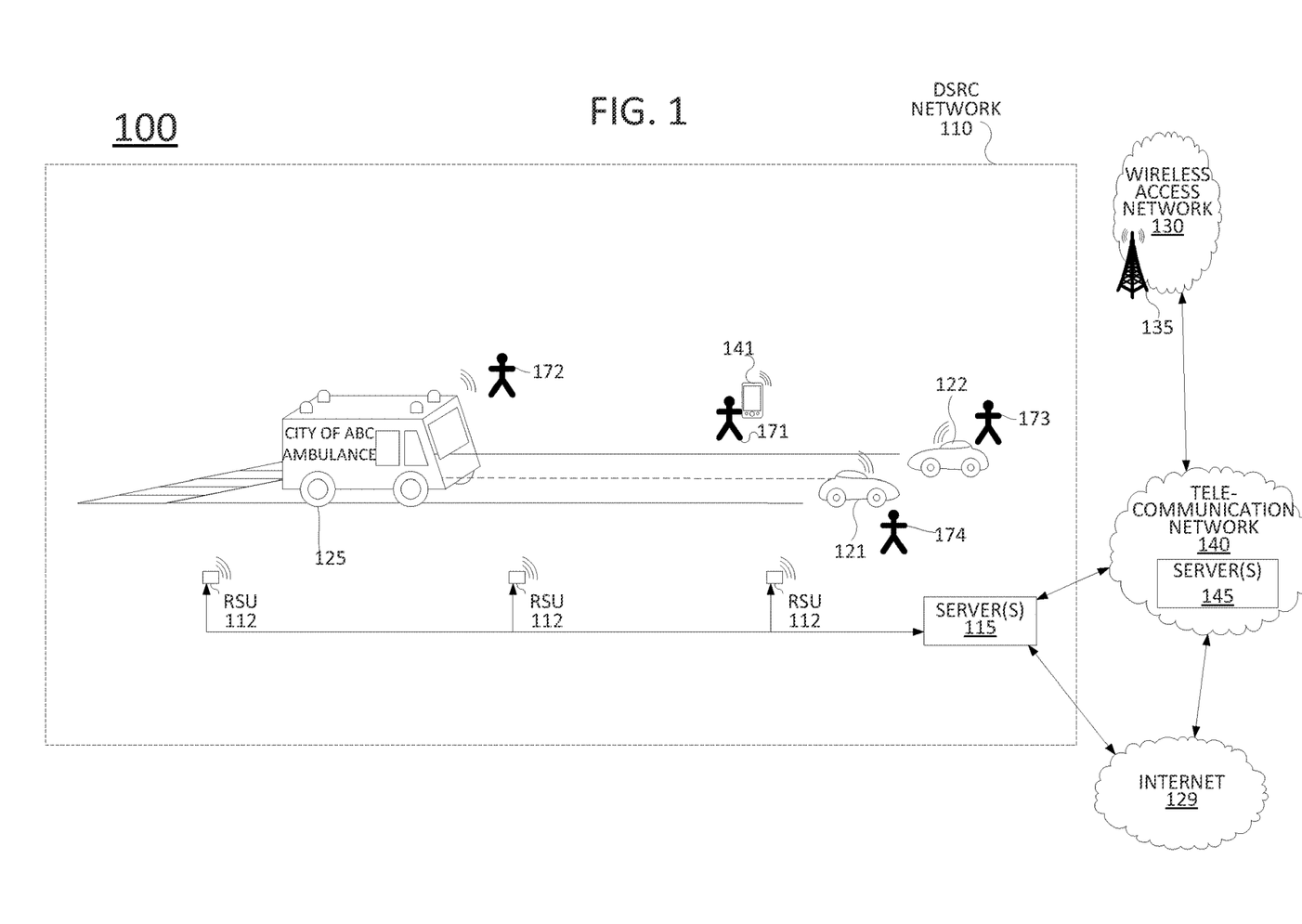
FIG. 1 illustrates an exemplary network related to the present disclosure.

To aid in understanding the present disclosure, FIG. 1 illustrates an example system 100 (e.g., one or more networks) in which examples of the present disclosure may operate. In one illustrative embodiment, the system 100 comprises a telecommunication network 140, a wireless access network 130 (e.g., a cellular access network), a dedicated short range communication (DSRC) network 110, and the Internet 129. In one example, wireless access network 130 may comprise a Universal Terrestrial Radio Access Network (UTRAN), or an evolved Universal Terrestrial Radio Access Network (eUTRAN) and the base station 135 may comprise a NodeB or an evolved NodeB (eNodeB), or may comprise a 5G radio access network, e.g., where base station 135 may comprise a gNodeB (or gNB). In one example, the telecommunication network 140 may comprise an Evolved Packet Core (EPC) network, or the like. In another example, telecommunication network 140 comprises an IP network, a multi-protocol label switching (MPLS) network, etc. In still another example, the wireless access network 130 may comprise a basic service set and the base station 135 may comprise a base transceiver station (BTS). In other words, wireless access network 130 may comprise a second generation (2G) network, a third generation (3G) network, a fourth generation (4G) network and/or a Long Term Evolution (LTE) network, a 5G network, and so forth.

In one example, the wireless access network 130, the telecommunication network 140, and/or the DSRC network 110 may be operated by different service providers, the same service provider or a combination thereof. For example, DSRC network 110 may be operated by a governmental entity or a private entity managing a transportation region on behalf of a governmental entity. On the other hand, wireless access network 130 and/or telecommunication network 140 may be operated by a telecommunications network service provider. Various interconnections between DSRC network 110, wireless access network 130, telecommunication network 140, and other components are shown. In accordance with the present disclosure, it is contemplated that various communication devices may utilize any one or a combination of such networks and interfaces in order to communicate with one another.

In one example, the internal communications of the DSRC network 110 may use a 75 MHz frequency band around 5.925 GHz assigned by the Federal Communication Commission (FCC) of the United States for Intelligent Transportation Systems, or DSRC networks. In general, DSRC networks enable wireless vehicle-to-vehicle communications and vehicle-to-infrastructure communications. DSRC networks may exist for transmitting safety and road condition information to vehicles, to warn of traffic and weather, to sense nearby vehicles (e.g., blind spot detection), and so forth. In this regard, DSRC networks contemplate an on-board unit (OBU) for DSRC enabled vehicles to transmit, as well as to receive and display messages.

Accordingly, as illustrated in FIG. 1, DSRC network 110 may interconnect and control a number of infrastructure elements, also referred to herein as roadway resources, which include roadside units (RSUs) 112. Other infrastructure elements that are not specifically illustrated in FIG. 1 may also comprise part of the DSRC network 110, e.g., traffic lights, informational signs (e.g., road-side display screens), restricted access gate(s), and so forth. DSRC network 110 also includes one or more servers 115 for managing infrastructure elements, for communicating with other elements and for controlling other aspects of the DSRC network 110.

Figure 4:
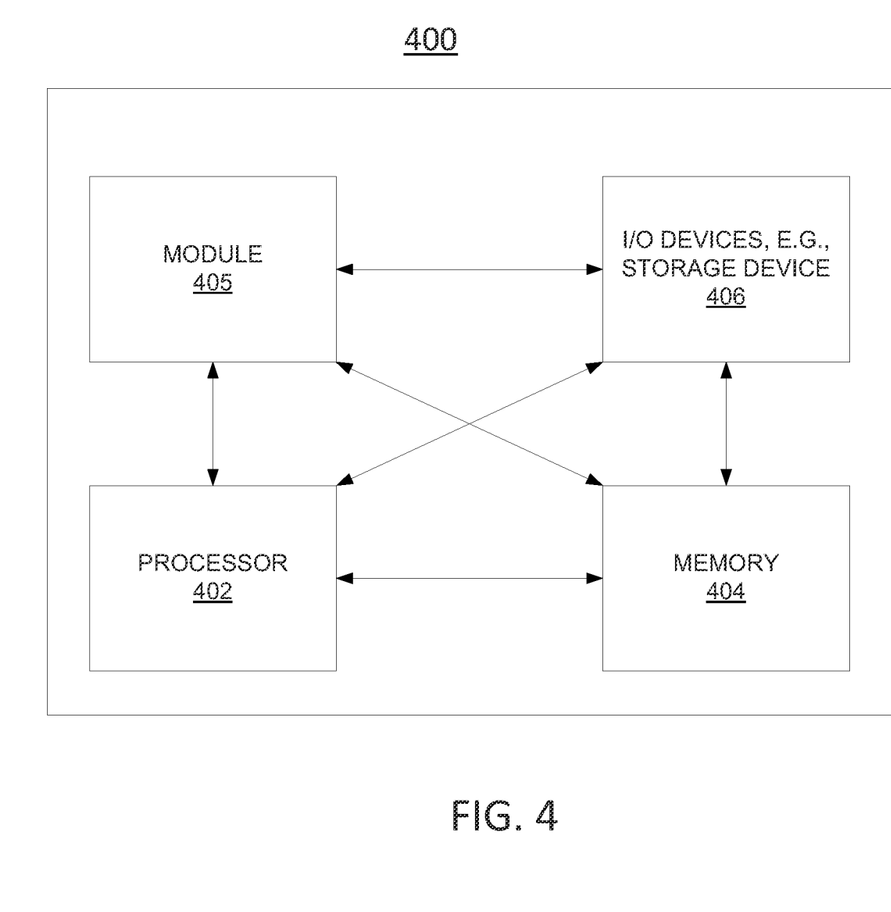
FIG. 4 illustrates an example high-level block diagram of a computing device specifically programmed to perform the steps, functions, blocks, and/or operations described herein.

In one example, the server(s) 115 may comprise a computing system, or systems, such as one or more instances of computing system 400 depicted in FIG. 4, and may be configured to provide one or more functions for presenting to an operator of an emergency service vehicle information associated with an entity notified of a presence of the emergency service vehicle, in accordance with the present disclosure. For example, server(s) 115 may be configured to perform one or more steps, functions, or operations in connection with the example method 300 described below. In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 4 and discussed below) or multiple computing devices collectively configured to perform various steps, functions, and/or operations in accordance with the present disclosure.

It should be noted that any one or more of the functions described herein with respect to the DSRC network 110 may be performed by server(s) 115 and/or a plurality of servers deployed in a distributed environment (e.g., in a "cloud-based" environment). For instance, DSRC network 110/server(s) 115 may control the timing of traffic lights, may coordinate the timing of two or more of traffic lights in a synchronized manner, and so forth. Henceforth, for illustrative purposes, various embodiments of the present disclosure are described in connection with steps, functions and/or operations performed by or facilitated by server(s) 115. It should also be noted that DSRC network 110 may operate in accordance with alternative or additional technologies. For instance, RSU(s) 112 may alternatively or additional comprise access points (APs) that may establish a wireless local area network (WLAN), e.g., an Institute for Electrical and Electronics Engineers (IEEE) 802.11 network (e.g., a Wi-Fi network), an IEEE 802.15, e.g., a Bluetooth network, a ZigBee network, and so forth, a mesh network comprising a combination of interconnected devices using a plurality of such communication modalities and protocols, or the like.

In addition, each of the vehicles 121 and 122, and ambulance 125 (e.g., another vehicle) illustrated in FIG. 1 may be equipped with an associated on-board unit (OBU) for communicating with the server(s) 115, e.g., via one or more of the RSUs 112. For example, each OBU may comprise one or more radio frequency (RF) transceivers for cellular communications and/or for non-cellular wireless communications. To illustrate, a traffic controller may provide server(s) 115 with a warning that there is a roadway hazard at an intersection, e.g., an icing condition, an accident, etc. Accordingly, the server(s) 115 may broadcast a warning message via one or more of the RSUs 112 near the intersection. In turn, the warning may be received by the OBU of any vehicle approaching the intersection to warn or instruct the driver to slow down and/or take other precautions. For example, the OBU may receive the message and present the text of the message on an in-vehicle display. Alternatively or in addition, the OBU may read the message via text-to-speech conversion. In one example, the OBU of each vehicle may comprise a navigation unit, or is connected to an associated navigation unit. For example, the OBU may include a global positioning system (GPS) navigation unit that enables the driver to input a destination, and which determines the current location, calculates one or more routes to the destination, and assists the driver in navigating a selected route. In one example, the OBU may alter a current programmed route to avoid the roadway hazard at the intersection.

The OBU of each vehicle may also be equipped to communicate with other OBUs. For instance, in general, DSRC networks enable wireless vehicle-to-vehicle (V2V) communications and vehicle-to-infrastructure (V2I) communications. Thus, in one example, vehicles 121 and 122, ambulance 125, and others may communicate with each other directly (e.g., without necessarily involving RSUs 122, server(s) 115, etc.). Alternatively, or in addition, in one example, the OBUs of each vehicle may be equipped for cellular communications. For instance, where coverage of the DRSC network 110 is weak or non-existent, wireless access network 130 and base station 135 may supplement the coverage to ensure that vehicles are not out of communication with each other and/or with server(s) 115. Similarly, in one example, vehicles 121 and 122, ambulance 125, and others may communicate with each other directly using an LTE sidelink, a 5G sidelink, or the like. As illustrated in FIG. 1, ambulance 125, vehicle 121, and vehicle 122 may be associated with users 172-174, respectively (e.g., operators/drivers). However, it should be noted that either or both of vehicles 121 and 122 may alternatively or additional comprise a self-driving, autonomous vehicle (AV), or may comprise a self-driving-capable vehicle that is operating in a self-driving/autonomous mode, e.g., where an operator/driver may disengage such feature and manually operate the vehicle at any time.

In one example, mobile device 141 may comprise any subscriber/customer endpoint device configured for wireless communication such as a laptop computer, a Wi-Fi device, a Personal Digital Assistant (PDA), a mobile phone, a smartphone, an email device, a computing tablet, a messaging device, and the like. In one example, mobile device 141 may have both cellular and non-cellular access capabilities. Thus, mobile device 141 may be in communication with server(s) 115 via a wireless connection to base station 135 and/or to RSU(s) 112. For instance, mobile device 141 may include one or more transceivers for cellular based communications, IEEE 802.11 based communications, IEEE 802.15 based communications, DSRC-based communications, and so forth. In one example, mobile device 114 may also be equipped to communicate directly with vehicles 121 and 122, ambulance 125, and others, e.g., via DSRC-based communications, via an LTE sidelink, a 5G sidelink, or the like, and so forth. In one example, mobile device 141 may be associated with user 171.

It should also be noted that in some examples it may be necessary or helpful to the DSRC network 110/server(s) 115 to have a lane-level accurate view of the traffic and road conditions. Accordingly, in one embodiment, server 115 may track vehicles' OBUs, mobile devices (such as mobile device 141), and so forth via RSUs 112. For instance, in addition to broadcasting and/or transmitting messages from server(s) 115 to vehicles, RSUs 112 may also interrogate OBUs of passing vehicles to determine a level of traffic, to determine which specific vehicles are travelling on the road, e.g., for toll charging and other purposes, and so forth. In one example the OBU of each vehicle may also be equipped with a Global Positioning System (GPS) unit for location sensing. In one example, the GPS using may be configured for differential GPS (DGPS) and/or real-time kinematic (RTK) location sensing. For example, DGPS uses the differential of the phase of a signal from the GPS/satellite signal to determine position with far greater accuracy. Real-time kinematics (RTK) further enhances the accuracy by employing a fixed ground-based reference receiver. For instance, as a satellite moves, the position of the reference receiver remains the same and is able to determine the movement of the satellite. This information is then provided by the ground-based reference receiver to a moving DGPS receiver to assist in the location determination. In particular, the user of DGPS in combination with RTK enables location sensing within a few centimeters accuracy. For instance, any one or more of RSUs 112, base station 135, or the like may comprise a reference receiver. Accordingly, an OBU may resolve its position with high accuracy via any one or more of: DSRC communications from RSUs 112, DGPS signals from one or more satellites, DGPS signals from one or more satellites in combination with RTK information from a reference receiver, and so forth. In particular, in one embodiment DGPS/RTK information may be used in conjunction with direct positioning information from RSUs 112 to provide redundancy and/or to provide coverage in areas where there is little to no infrastructure of DSRC network 110. However, in another example, an OBU may solely use DGPS and/or DGPS/RTK information to determine a vehicle's position. In any case, the OBU of each of vehicle may then report a determined vehicle position to the DSRC network 110/server 115. For instance, an OBU may report location via DSRC messaging to RSUs 112 and/or via cellular communications with base station 135/wireless access network 130. It should be noted that mobile devices, such as mobile device 141, may be similarly equipped and may also participate in resolving and sharing location information of mobile device 141 with server(s) 115, vehicles 121 and 122, ambulance 125, and so forth, and/or may enable mobile device locations to be determined by server(s) 115 and/or RSUs 112.

Figure 3:
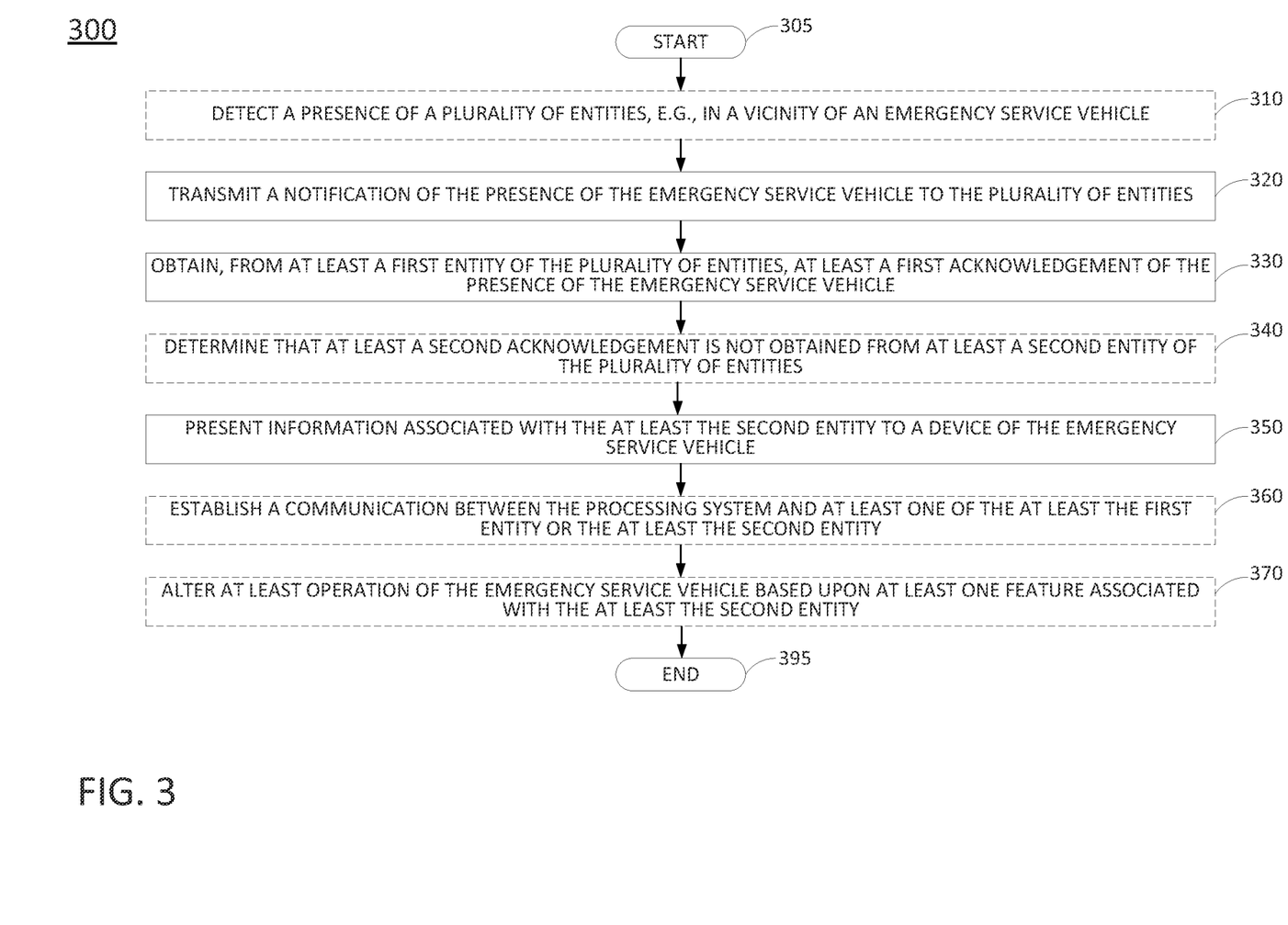
FIG. 3 illustrates a flowchart of an example method for presenting to an operator of an emergency service vehicle information associated with an entity notified of a presence of the emergency service vehicle.

In an illustrative example, an OBU of ambulance 125 may comprise a computing system, or systems, such as one or more instances of computing system 400 depicted in FIG. 4, and may be configured to provide one or more functions for presenting to an operator of an emergency service vehicle information associated with an entity notified of a presence of the emergency service vehicle, such as illustrated in FIG. 3 and described in greater detail below in connection with the example method 300. For instance, examples of the present disclosure may provide an awareness of relevant entities to an operator, e.g., a driver, of an emergency service vehicle, such as user 172 operating ambulance 125. In accordance with the present disclosure, these entities may include other vehicles, such as vehicles 121 and 122, as well as pedestrians, such as user 171, or others, such as cyclists, animals such as service dogs, or the like.

Continuing with the present example, ambulance 125 may receive notification of a medical emergency, a fire, or the like which calls for haste and for which emergency systems are engaged (e.g., flashing lights, sirens, etc.). In this situation, traffic laws, regulations, etc. typically require vehicles or other entities to yield to the ambulance 125 and to permit the ambulance 125 to cross intersections against traffic signals (e.g., running red lights, etc.). However, not all drivers, pedestrians, or others may be fully aware of the approaching ambulance 125, or may not be fully capable of having such awareness (such as blind or hearing-impaired pedestrians, hearing impaired drivers, etc., pedestrians listening to loud music via headphones, pedestrians intensely focusing on mobile computing devices, and so forth). In addition, some drivers may simply ignore or may be unaware of the correct actions when an emergency service vehicle, such as ambulance 125, is rapidly approaching with lights and sirens on. For example, a driver stopped in traffic at a red light may not immediately move over to a shoulder of the road to allow the emergency service vehicle to pass. In addition, self-operating vehicles may be slower to audibly or visually detect an emergency service vehicle such as ambulance 125 operating in an emergency service mode. In addition, due to other vehicles making unpredictable moves, it may not be readily apparent to the self-operating vehicle where best to move (or whether to stay in place).

In accordance with the present disclosure, when ambulance 125 enters into an emergency operation mode/emergency service operations, e.g., lights and sirens activated, the ambulance 125 may additionally perform operations for notifying other entities of the presence of the ambulance 125, obtaining acknowledgements from such entities, identifying any entity or entities that do not respond, and presenting information to the operator of the ambulance 125 regarding any non-responsive entities (and in one example, responsive entities as well). In one example, ambulance 125 may also provide or enable one or two-way communication between ambulance 125 and one or more of the other entities. In one example, server(s) 115 may perform all or a portion of these operations on behalf of, or for the benefit of the ambulance 125 and/or an operator thereof (e.g., user 172).

In one example, the ambulance 125 may first detect a presence of a plurality of entities. For example, the ambulance 125 may obtain location information reported by the plurality of entities, may detect wireless signals from the plurality of entities, may perform LiDAR based identification of the plurality of entities, and so forth. Alternatively, or in addition, server(s) 115 may detect the presence of the plurality of entities in the vicinity of the ambulance 125, such as via location reporting by the plurality of entities, detection of wireless signals from the plurality of entities (e.g., via RSUs 112), etc., and where the location and/or intended route of the ambulance 125 is also provided to or detected by the server(s) 115.

To illustrate, ambulance 125 may transmit a notification that it is engaged in emergency service operations e.g., as a broadcast or via unicast messages to different entities. The notification may be a DSRC-based communication, a cellular sidelink communication, or the like. Alternatively, or in addition, the notification may be transmitted via wireless access network 130, e.g., where ambulance 125 may be of a special class of devices permitted to request and to make broadcasts via base station 135. In one example, the ambulance 125 may broadcast the notification to any participating entities within range of such broadcast. In one example, the broadcast may be received and retransmitted by RSUs 112, or by server(s) 115 via RSUs 112 (e.g., in the area of DSRC network 110, within a certain distance or range from the ambulance 125 (as identified by the ambulance 125 and/or as otherwise determined by RSUs 112), and so on). In still another example, the ambulance 125 may submit the notification to server(s) 115, which may transmit the notification via RSUs 112 to any DSRC-equipped or otherwise participating entities/devices within range (e.g., vehicle OBUs, users' mobile devices, etc.). For instance, server(s) 115 may track entities within a coverage area of DSRC network 110 (e.g., entities within communication range of RSUs 112), their locations, and other information). Server(s) 115 may provide to ambulance 125 information regarding any entities on or near an intended route of ambulance 125. Thus, in one example, ambulance 125 may broadcast or otherwise transmit a notification to those entities that are so identified. In another example, the server(s) 115 may similarly broadcast or otherwise transmit the notification to the identified entities on behalf of ambulance 125.

In one example, the notification may include additional useful information, such as a planned route, intended destination, or the like. In one example, additional information may include whether a particular entity is within a field-of-view or line of sight of the ambulance 125, such as detected via a LiDAR unit of the ambulance 125 (but not necessarily noticed by user 172). The notification may be received by various entities (e.g., participating entities), such as vehicles 121 and 122 via respective OBUs, user 171 via mobile device 141, and so forth. In accordance with the present disclosure, participating entities may be tasked with providing acknowledgements to such a notification (broadly, an emergency service vehicle notification), which may constitute positive acknowledgement that the entity and/or operator thereof is aware of the ambulance 125. For instance, an OBU of vehicle 121 may receive a notification and may present an audible announcement (e.g., "Emergency Vehicle Approaching From Behind," "Emergency Vehicle Approaching Directly Ahead," "Emergency Vehicle Approaching From The Left At The Upcoming Intersection," "Emergency Vehicle Approaching From The Right At The Upcoming Intersection," etc.) to a vehicle operator (e.g., user 174) via text-to-speech conversion and/or may present the notification visually via a display screen, a windshield or dashboard projection, via an augmented reality (AR) headset, and so forth. The OBU may similarly obtain an acknowledgement from user 174 via a speech input, via a touch input via a touchscreen, via a steering wheel or other user interface buttons, and so forth. In one example, an autonomous vehicle or other vehicles in self-operating mode (such as vehicle 122) may also receive the notification and may automatically respond with an acknowledgment that the vehicle 122 is aware of the ambulance 125. In one example, a human operator, e.g., user 173, may also be presented with the notification and may provide an acknowledgement that user 173 is aware of the ambulance 125. For instance, user 173 may engage to take over and begin manually operating vehicle 122. In one example, the acknowledgement(s) may indicate that the user 173 has taken over the operations of the vehicle.

Similarly, user 171 may receive such a notification via mobile device 141. In one example, the mobile device 141 may be configured to automatically present the notification, e.g., to interrupt one or more other active applications on the mobile device 141, such as to pause or mute a video, music, a phone call, a text message application window or screen, etc. The notification may be presented audibly, visually, or both. In addition, mobile device 141 may obtain an acknowledgement from user 171 via a speech input, via a touch input via a touchscreen or user interface button, and so forth. With respect to vehicles 121 and 122, and mobile device 141, the acknowledgements may be sent to ambulance 125 via the same or different modality (or modalities) as the notification was transmitted. For instance, any one or more of the acknowledgements may be in accordance with DSRC-based communications, cellular sidelink communications, or the like. Alternatively, or in addition, any one or more of the acknowledgements may be via wireless access network 130, where the acknowledgment(s) may be received by ambulance 125 (e.g., an OBU thereof) via DSRC network 110 and/or via wireless access network 130. In one example, any one or more of the acknowledgements may be transmitted to and/or otherwise obtained by server(s) 115, which may forward the acknowledgement(s) to ambulance 125 via RSUs 112 and/or may provide summary or bulk information regarding a plurality of acknowledgments.

In one example, for an entity comprising a pedestrian, a human-operated vehicle, a cyclist, or the like, a first acknowledgement may be sent by a device or computing system of the receiving entity (e.g., a vehicle OBU, a mobile device, etc.), to indicate that the notification is received by the device or computing system. Thereafter, a second acknowledgement may provide a positive indication that the human has been presented with and is aware of the notification. For instance, a first acknowledgement may provide to ambulance 125 and user 172 an indication that the notification was delivered correctly, such as to mobile device 141. However, if a second acknowledgement is not received, then the ambulance 125 and user 172 may be informed that although the notification was delivered and received by the mobile device 141, the user 171 may still be unaware of the presence of the ambulance 125 (and therefore also unaware that ambulance 125 is operating in an emergency service mode).

In one example, an acknowledgement may include additional information, such as information regarding an impairment or other conditions of a user and/or vehicle. For example, an acknowledgement may include an indication that a user is hearing impaired or vision impaired, an indication that a user is engaged in a phone call, an indication that a vehicle is in self-driving mode or is being human-operated, an indication that a vehicle is being driven by a new driver, a driver with a permit or temporary license, etc., an indication of intended navigational maneuvers, such as a planned left turn coming up as recommended by a GPS unit, or the like, and so forth. Alternatively, or in addition, in one example, server(s) 115 may add such additional information when forwarding acknowledgments to ambulance 125 (e.g., in an example in which server(s) 115 are involved in the receiving and forwarding of acknowledgements).

In one example, one or more entities may fail to receive the notification, may receive the notification but fail to provide an acknowledgement (e.g., by a receiving device or computing system, and/or by a human user associated therewith), or may send an acknowledgement which is not received by ambulance 125 (or by server(s) 115 for forwarding to ambulance 125). In any of these cases, ambulance 125 (or server(s) 115) may determine that an acknowledgement is not received from one or more entities to which the notification was directed. In an example in which server(s) 115 make such a determination, server(s) 115 may transmit one or more messages to ambulance 125 to inform of the one or more entities from which acknowledgements were not received.

Having identified the one or more entities from which acknowledgements were not received, ambulance 125 may present information associated with one or more of the identified entities to an operator, e.g., user 172, of the ambulance 125. For example, the information may be presented via any one or more of an audio output, a display screen, an augmented reality display, and so forth. When presented visually, the information may be presented in text form, via a map with markers identifying locations of the one or more entities (where text or other information may be presented along with the markers on the map (e.g., adjacent to the markers, in a dialog/text box, or the like, etc.)), as AR content overlaid on real-world imagery, such as highlighting of an entity where the entity is within a field-of-view of the AR display, presenting text or other information on or next to the entity when the entity is within the field-of-view, and so forth. The additional information may include an indication if an acknowledgement was received from a device or computing system but not from a human associated therewith. Additional information presented may include, for one or more of the entities, a location, a trajectory (e.g., determined by server(s) 115 via RSUs 112), a type of entity (e.g., self-driving vehicle, human-operated vehicle, pedestrian, etc.), an awareness condition (e.g., if the entity is hearing or vision impaired, if the entity is on a phone call, listening to music, etc.), or other information.

Figure 2:
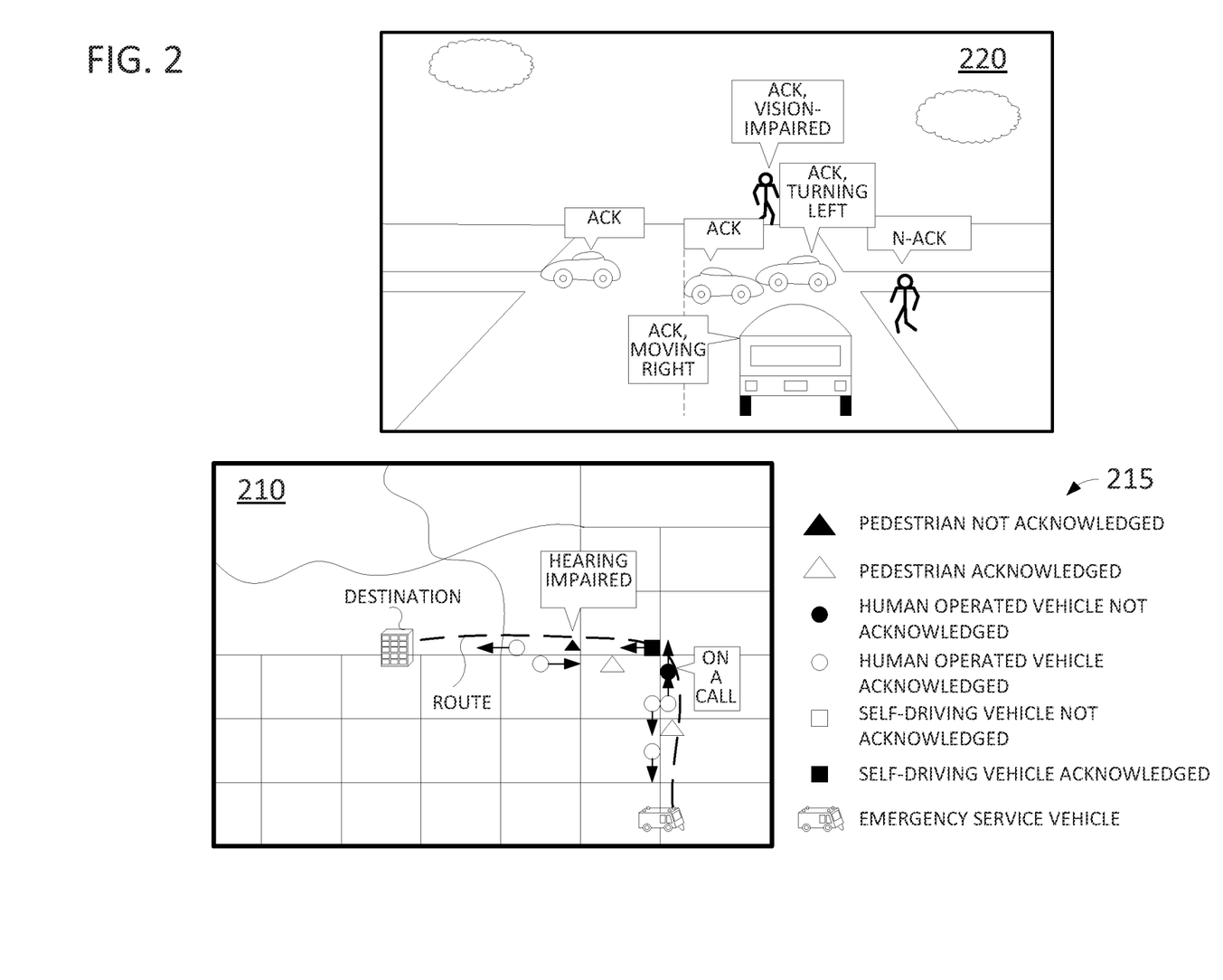
FIG. 2 illustrates examples of presenting to an operator of an emergency service vehicle information associated with an entity notified of a presence of the emergency service vehicle, in accordance with the present disclosure.

In one example, ambulance 125 may also identify or may learn from server(s) 115 of the entities from which acknowledgements are received. In addition, in one example, ambulance 125 may also present information associated with the one or more entities from which acknowledgements are received, such as presenting on a map of one or more entities with different shaped markers and/or different colored markers as compared to one or more entities from which acknowledgements were not received, via AR overlay content of a different color, shading, or the like, and so on. In one example, additional information regarding these entities may also be presented, such as a location, a trajectory (which may be calculated by server(s) 115, or which may be an intended route or next navigational operation as provided by the entity along with the acknowledgement), a type of entity, an awareness condition, or other information. The additional information regarding these entities may be provided by server(s) 115 and/or by the entities themselves either as part of, or as one or more separate messages accompanying each acknowledgement. In this regard, FIG. 2 illustrates examples of visual presentation of information associated with various entities for an operator of an emergency service vehicle, in accordance with the present disclosure.

As noted above, in one example, ambulance 125 may also enable a one-way or two-way voice communication session between user 172 and another entity, such as user 171 via mobile device 141. For instance, user 172 may be presented with information indicating that user 171 is temporarily using crutches or a cane to assist in walking. In this case, user 172 may provide an input to the OBU of ambulance 125 indicating that user 172 wishes to establish a verbal communication session with user 171, such as via a voice command, a touch input via a touchscreen, or the like. In one example, the mobile device 141 may be configured to establish the communication session without additional input by user 171. Thus, user 172 may communicate for example that user 172 sees user 171 and may tell user 171 not to worry and that the ambulance 125 will not be approaching closely to user 171 as the ambulance passes by.

In another example, vehicle 121 may be operating in a self-driving mode and may provide an acknowledgement that is received by ambulance 125. However, as ambulance 125 may be approaching and may desire to pass the vehicle 121, the vehicle 121 may not yield, or may be moving towards the shoulder of the road, whereas user 172 may prefer that the vehicle 121 actually move toward the center of the road or the oncoming lane. In this case, user 172 may provide an input to the OBU of ambulance 125 indicating that user 172 wishes to establish a verbal communication session with vehicle 121 (e.g., with user 174). In one example, the vehicle 121 (e.g., the OBU thereof) may be configured to establish the communication session without additional input by user 174. Thus, for example, user 172 may begin speaking and may direct user 174 to manually engage the vehicle 121 to move as directed by user 172.

The foregoing illustrates just several scenarios of how the system 100 may support examples of the present disclosure for presenting to an operator of an emergency service vehicle information associated with an entity notified of a presence of the emergency service vehicle. Thus, it should be noted that various other operations may be included in various examples. For instance, in another example, the ambulance 125 may include assisted-driving capabilities and may alter at least one operation of the ambulance 125 based upon at least one feature associated with one or more of the entities, such as changing a course of the ambulance 125, slowing the ambulance 125 in a vicinity of one or more entities, and so forth. For instance, if the ambulance 125 is about to pass a non-acknowledging cyclist, the ambulance 125 may automatically slow, may provide haptic feedback via a steering wheel to encourage user 172 to alter course to provide a wider passing distance than would otherwise be used, may increase a siren volume, and so forth. Thus, these and other features are all contemplated within the scope of the present disclosure.

As further illustrated in FIG. 1, telecommunication network 140 also includes a server 145 which may perform the same or similar functions to server 115 in DSRC network 110. For example, DSRC network 110 may comprise just one portion of a region through which an emergency service vehicle, such as ambulance 125, may travel on a trip. For example, the route for the ambulance 125 may cross from one state to another. The route may also traverse local roads, county roads, state roads, roads and infrastructure of a regional entity (e.g., an interstate agency, such as a bi-state port authority, toll authority), and so forth. Thus, in one example a telecommunications service provider, e.g., the operator of telecommunication network 140 and/or wireless access network 130, may implement functions of any one or more of the embodiments described herein. For example, server 145 may determine a route for ambulance 125. The server 145 may also determine one or more traffic management regions traversed by the route, associated DSRC network(s) managing the infrastructure/roadway resources along the route, and so forth. The server 145 may then transmit instructions or requests to one or more DSRC networks to provide navigational assistance and/or other entity awareness, as described herein, and so forth.

The above system 100 is described to provide an illustrative environment in which examples of the present disclosure may be employed. In other words, the system 100 is merely illustrative of one network configuration that is suitable for implementing examples of the present disclosure. Thus, the present disclosure may also include any other different network configurations that are suitable for implementing embodiments of the present disclosure. For example, wireless access network 130 may comprise a wide area network (WAN), a series of LANs and so forth. Similarly, as illustrated in FIG. 1, DSRC network 110 may interconnect infrastructure elements in the 5.9 GHz DSRC band. However, the present disclosure is not limited to any specific protocol, such as DSRC, or any particular communication medium, e.g., the particular 5.9 GHz frequency band. For example, communications between OBUs and RSUs may involve radio frequency identification (RFID) interrogation, or other forms of wireless communication. In addition, DSRC network 110 may include wired portions for connecting infrastructure elements to each other, to server(s) 115 and so forth. In one example, RSUs 112 may be integrated into other infrastructures, such as traffic lights, street lights, and so forth. In still another example, the OBU of a vehicle may instead comprise a cellular telephone, a smart phone or other portable devices which are removable from the vehicle and which support additional functions besides DSRC messaging. Thus, networks including the above modifications and/or various additional modifications of the same or a similar nature are all included within the scope of the present disclosure.

To further aid in understanding the present disclosure, FIG. 2 illustrates examples of presenting to an operator of an emergency service vehicle information associated with an entity notified of a presence of the emergency service vehicle, in accordance with the present disclosure. For instance, a first view, e.g., a map view 210, illustrates an emergency service vehicle, such as a police vehicle, a fire truck or engine, an ambulance (e.g., ambulance 125 of FIG. 1), or the like, an intended route, and the destination, such as a location of an emergency, a hospital, etc. The map view 210 also illustrates markers representing various entities that may be detected along the route. Notably, each marker identifies the type of entity, as well as the status of the entity with respect to whether an acknowledgment of a notification has or has not been received from the entity. The map view 210 may be presented, for example, to an operator of the emergency service vehicle, such as via a navigation screen or the like. As illustrated in FIG. 2, the map view 210 may further include additional information for several entities. For instance, trajectories of several entities are indicated in the map view 210 (e.g., arrows indicating direction of travel). In addition, one of the non-acknowledging pedestrians is indicated as being hearing impaired, which may be particularly useful information to an operator of the emergency service vehicle, who may then use additional caution near this person.

Similarly, as further illustrated in the map view 210, one of the non-acknowledging human-operated vehicles may be indicated to be "on a call." For example, an OBU of the vehicle may receive a notification of the presence of the emergency service vehicle and may provide an acknowledgment. However, the driver of the vehicle may fail to provide an acknowledgment in response to the notification, indicating that the driver may still be unaware of the presence of the emergency service vehicle, is too involved in the phone call to provide a response, etc. In any case, the operator of the emergency service vehicle may be provided with such information, which strongly indicates that the driver is not fully engaged. Thus, the operator of the emergency service vehicle may anticipate that this particular driver may fail to yield to the emergency service vehicle, or is otherwise a greater risk to the emergency service vehicle. In various examples, the map key 215 may or may not be presented along with the map view 210, or may be selectable by an operator of the emergency service vehicle to be displayed or not displayed.

A next example view, e.g., augmented reality (AR) view 220, illustrates what may be seen by and presented to an operator of an emergency service vehicle, e.g., when operating in an emergency service mode. For instance, in the AR view 220, different entities may be identified and indicated as either having provided an acknowledgment or not. Additional information may be provided with respect to one or more of the entities. For example, the AR view 220 includes an indication that the vehicle directly in front will be moving to the right, and indication that a crossing vehicle is planning to turn left, etc. In addition, a pedestrian in the distance is indicated as being vision-impaired. Thus, the operator of the emergency service vehicle may be provided with various useful information regarding entities encountered along the route of the emergency service vehicle. It should be noted that the foregoing examples presented in connection with FIG. 2 are provided for illustrative purposes only, and not by way of limitation. Thus, those skilled in the art will realize that other, further and different examples of presenting to an operator of an emergency service vehicle information associated with an entity notified of a presence of the emergency service vehicle may be devised in accordance with the present disclosure.

FIG. 3 illustrates a flowchart of an example method 300 for presenting to an operator of an emergency service vehicle information associated with an entity notified of a presence of the emergency service vehicle. In one example, steps, functions and/or operations of the method 300 may be performed by a device or system as illustrated in FIG. 1, e.g., by one or more of server(s) 115 and/or a device or system of an emergency service vehicle, such as an OBU, or any one or more components thereof. Alternatively, or in addition, the steps, functions and/or operations of the method 300 may be performed by a processing system collectively comprising a plurality of devices as illustrated in FIG. 1, such as server(s) 115, an OBU of ambulance 125 (or another emergency service vehicle), devices or computing/processing systems of various other entities, and so forth. In one example, the steps, functions, or operations of method 300 may be performed by a computing device or processing system, such as computing system 400 and/or hardware processor element 302 as described in connection with FIG. 4 below. For instance, the computing system 400 may represent any one or more components of the system 100 that is/are configured to perform the steps, functions and/or operations of the method 300. Similarly, in one example, the steps, functions, or operations of the method 300 may be performed by a processing system comprising one or more computing devices collectively configured to perform various steps, functions, and/or operations of the method 300. For instance, multiple instances of the computing system 400 may collectively function as a processing system. For illustrative purposes, the method 300 is described in greater detail below in connection with an example performed by a processing system. The method 300 begins in step 305 and may proceed to optional step 310 or to step 320.

At optional step 310, the processing system may detect a presence of a plurality of entities, e.g., in a vicinity of an emergency service vehicle. In one example, the processing system may comprise a network-based processing system. In one example, the processing system may be deployed in the emergency service vehicle. The plurality of entities may be detected by location reporting by the plurality of entities, detection of wireless signals from the plurality of entities, LiDAR-base identification of the plurality of entities, etc. It should be noted that in one example, there may be line-of-sight visibility of one or more of the plurality of entities. However, this does not immediately indicate that another entity is aware of the emergency service vehicle (or that operator of emergency service vehicle is aware of the other entity). It should also be noted that the vicinity of the emergency service vehicle may vary depending upon the type of emergency service vehicle, the nature of a current emergency, the speed and/or direction of travel of the emergency service vehicle, an intended route of the emergency service vehicle, the sensing range of the modality used to detect the presence of the plurality of entities (e.g., self-reporting by one or more entities in an area vs. LiDAR-based detection via a LiDAR unit of the emergency service vehicle), and so on.

At step 320, the processing system transmits a notification of a presence of an emergency service vehicle to a plurality of entities. In one example, the notification may further include a route of the emergency service vehicle (e.g., an intended route). The plurality of entities may be those identified at optional step 310, which may be targeted with a broadcast notification, or multiple individual transmissions of the notification. In one example, the plurality of entities may alternatively or additionally comprise any entities within a broadcast zone that may be within range to receive a wireless broadcast of the notification. For instance, the notification may be broadcast via a cellular base station, via one or more RSUs of a DSRC network, by the emergency service vehicle itself (e.g., by the processing system, or by the processing system comprising a network-based processing system via the emergency service vehicle), such as an LTE or 5G sidelink broadcast, and so forth.

At step 330, the processing system obtains, from at least a first entity of the plurality of entities, at least a first acknowledgement of the presence of the emergency service vehicle. For instance, the at least the first acknowledgement may be obtained via at least a first mobile computing device of a pedestrian or the cyclist, at least a first on-board computing system of a self-operating vehicle or a human-operated vehicle, or the like.

At step 340, the processing system determines that at least a second acknowledgement is not obtained from at least a second entity of the plurality of entities. In one example, step 340 may comprise determining that an acknowledgement is not received from the least the second entity (which may be identified at optional step 310, in one example) within a threshold period of time following the transmission of the notification at step 320.

At step 350, the processing system presents information associated with the at least the second entity to a device (observable by an operator) of the emergency service vehicle. In various examples, the information may be presented via one or more of: an audio output of a speaker, a display screen of the emergency service vehicle, or an augmented reality (AR) display (e.g., of a AR headset of an operator of the emergency service vehicle, or a projection of information on a windshield, dashboard, or other locations of the emergency service vehicle). The information may comprise at least one feature of the second entity, such as: a location of the at least the second entity, a trajectory of the at least the second entity, a type of entity of the at least the second entity, an awareness condition of the at least the second entity, etc. For instance, a trajectory may include a speed and a direction (e.g., where the second entity can be tracked over a period of time long enough to determine speed and direction) and/or an intended navigation path, such as according to a GPS/navigation unit. The type of entity may comprise a pedestrian, a cyclist, a self-operating vehicle (e.g., an autonomous vehicle, or a vehicle in self-operating mode that is also human-controllable), a human-operated vehicle, and so forth. The awareness condition may comprise an awareness impairment, such as a vision impairment, a hearing impairment, or other cognitive impairments.

In one example, the awareness condition may be a registered condition of the at least the second entity. For instance, when enrolling to participate in receiving notifications from and providing acknowledgments to emergency service vehicles in accordance with the present disclosure, a user or other responsible entities, such as a parent of child, a caregiver of an elderly person, etc., may provide information regarding one or more impairments of the user to be stored in an entity record in an entity database. Alternatively, or in addition, an awareness condition may be determined from a computing device of the entity. For instance, the computing device may store information regarding the impairment(s) of the user that may be provided along with an acknowledgment of the notification. In one example, an impairment may be a temporary impairment. For instance, a pedestrian or driver may be participating in a phone call which may affect an ability to process additional information, such as the notification of the presence of the emergency service vehicle. It should be noted that in such an example, the computing device of the pedestrian or driver may provide a first acknowledgment of the notification, but the pedestrian or driver may not provide an expected second acknowledgment comprising a positive affirmation of an awareness of the notification (e.g., via a user input, such as a verbal acknowledgment, pressing a button on a touchscreen, a physical button on a steering wheel or other user interface, etc.).

In one example, the presenting of step 350 may further include presenting information associated with the at least the first entity to the operator of the emergency service vehicle. For instance, the information associated with the at least the first entity may be presented in the same or a similar manner as the information associated with the at least the second entity. In one example, a visual indicator may distinguish between the acknowledging and non-acknowledging entities, such as a different color marker on a map, a different highlighting or shading via an AR display, etc. In one example, step 350 may include providing additional information regarding the at least the first entity in the same manner as for non-responding entities. For example, a pedestrian may receive a notification and provide an acknowledgment via the pedestrian's mobile device. In addition, if the pedestrian is hearing impaired, the emergency service vehicle may receive information to present to the operator that indicates the pedestrian has acknowledged and is aware of the emergency service vehicle, but is hearing impaired. Thus, if circumstances change such that the emergency service vehicle will approach closer to the pedestrian than anticipated, it may be helpful to know that the pedestrian may not necessarily hear that the emergency service vehicle is much closer (e.g., the operator may use additional caution around the pedestrian, even though the pedestrian has provided an acknowledgment indicating prior awareness of the presence of the emergency service vehicle).

At optional step 360, the processing system may establish a communication between the processing system and at least one of: the at least the first entity or the at least the second entity. The communication may be a two-way audio communication, or may be one-way for the operator of emergency service vehicle to instruct or otherwise speak to one of the entities (e.g., "I am passing you on your right," "hold your lane," etc.).

At optional step 370, the processing system may alter at least one aspect of the operation of the emergency service vehicle based upon at least one feature associated with the at least the second entity. For instance, the altering may include changing a course of the emergency service vehicle, slowing the emergency service vehicle in a vicinity of the at least the second entity, increasing a siren volume when approaching the vicinity of the at least the second entity, introducing a new siren tone when approaching the vicinity of the at least the second entity, or the like.

Following step 350, or one of the optional steps 360 or 370, the method 300 proceeds to step 395. At step 395, the method 300 ends.

It should be noted that the method 300 may be expanded to include additional steps, or may be modified to replace steps with different steps, to combine steps, to omit steps, to perform steps in a different order, and so forth. For instance, in one example the processing system may repeat one or more steps of the method 300 for additional time periods during a same event, for a different event (e.g., for a different emergency call), and so forth. In one example, the method 300 may be expanded to include obtaining the additional information regarding the plurality of entities (e.g., a network-based processing system may receive and store information regarding the plurality of entities in an entity database from which the information may be retrieved and used in connection with the presenting of the information at step 350). In one example, the at least the second entity may include an entity without a computing device-based communication capability, such as a non-autonomous vehicle, a pedestrian or a cyclist without a mobile computing device, an animal such as a service dog, etc. For instance, a domesticated animal may be detected via radio frequency identification (RFID) based tracking of a RFID tag or collar (such as via RSUs of a DSRC network, or the like). Humans without mobile computing devices, domesticated or non-domesticated animals, or other entities may also be detected via LiDAR based sensing, via machine learning (ML) and/or computer vise (CV) based detection using image data from a camera of the emergency service vehicle and/or one or more cameras deployed in an environment, and so forth. Accordingly, step 350 may further include presenting information regarding any or all of such entities so detected. In various other examples, the method 300 may further include or may be modified to comprise aspects of any of the above-described examples in connection with FIGS. 1 and 2, or as otherwise described in the present disclosure. Thus, these and other modifications are all contemplated within the scope of the present disclosure.

In addition, although not expressly specified above, one or more steps of the method 300 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 3 that recite a determining operation or involve a decision do not necessarily require that both branches of the determining operation be practiced. In other words, one of the branches of the determining operation can be deemed as an optional step. However, the use of the term "optional step" is intended to only reflect different variations of a particular illustrative embodiment and is not intended to indicate that steps not labelled as optional steps to be deemed to be essential steps. Furthermore, operations, steps or blocks of the above described method(s) can be combined, separated, and/or performed in a different order from that described above, without departing from the example embodiments of the present disclosure.

FIG. 4 depicts a high-level block diagram of a computing device or processing system specifically programmed to perform the functions described herein. For example, any one or more components or devices illustrated in FIG. 1 or described in connection with the examples of FIGS. 2 and 3 may be implemented as the processing system 400. As depicted in FIG. 4, the processing system 400 comprises one or more hardware processor elements 402 (e.g., a microprocessor, a central processing unit (CPU) and the like), a memory 404, (e.g., random access memory (RAM), read only memory (ROM), a disk drive, an optical drive, a magnetic drive, and/or a Universal Serial Bus (USB) drive), a module 405 for presenting to an operator of an emergency service vehicle information associated with an entity notified of a presence of the emergency service vehicle, and various input/output devices 406, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one processor element is shown, it should be noted that the computing device may employ a plurality of processor elements. Furthermore, although only one computing device is shown in the Figure, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of this Figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 402 can also be configured or programmed to cause other devices to perform one or more operations as discussed above. In other words, the hardware processor 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 405 for presenting to an operator of an emergency service vehicle information associated with an entity notified of a presence of the emergency service vehicle (e.g., a software program comprising computer-executable instructions) can be loaded into memory 404 and executed by hardware processor element 402 to implement the steps, functions or operations as discussed above in connection with the example method(s). Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for presenting to an operator of an emergency service vehicle information associated with an entity notified of a presence of the emergency service vehicle (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A method comprising:
   transmitting, by a processing system including at least one processor, a notification of a presence of an emergency service vehicle to a plurality of entities;
   obtaining, by the processing system from at least a first entity of the plurality of entities, at least a first acknowledgement of the presence of the emergency service vehicle;
   determining, by the processing system, that at least a second acknowledgement is not obtained from at least a second entity of the plurality of entities;
   presenting, by the processing system, information associated with the at least the second entity to a device of the emergency service vehicle, wherein the information includes a status of the at least the second entity with respect to the at least the second acknowledgement not being obtained from the at least the second entity; and
   establishing, by the processing system, a communication between the processing system and at least one of: the at least the first entity or the at least the second entity.

2. The method of claim 1, wherein the information is presented to the device via at least one of:
   an audio output of a speaker;
   a display screen; or
   an augmented reality display.

3. The method of claim 2, wherein the information comprises at least one feature of the second entity, wherein the at least one feature comprises:
   a location of the at least the second entity;
   a trajectory of the at least the second entity;
   a type of entity of the at least the second entity; or
   an awareness condition of the at least the second entity.

4. The method of claim 3, further comprising:
   altering at least one operation of the emergency service vehicle based upon the at least one feature associated with the at least the second entity.

5. The method of claim 4, wherein the altering the at least one operation of the emergency service vehicle comprises:
   changing a course of the emergency service vehicle; or
   slowing the emergency service vehicle in a vicinity of the at least the second entity.

6. The method of claim 3, wherein the type of entity comprises:
   a pedestrian;
   a cyclist;
   a self-operating vehicle; or
   a human-operated vehicle.

7. The method of claim 3, wherein the awareness condition comprises an awareness impairment, wherein the awareness impairment comprises:
 a vision impairment;
 a hearing impairment; or
 a cognitive impairment.

8. The method of claim 3, wherein the awareness condition is a registered condition of the at least the second entity.

9. The method of claim 8, wherein the awareness condition is determined from a computing device of the at least the second entity.

10. The method of claim 1 wherein the at least the first acknowledgement is obtained via:
 at least a first mobile computing device of a pedestrian or a cyclist; or
 at least a first on-board computing system of a self-operating vehicle or a human-operated vehicle.

11. The method of claim 1, wherein the notification of the presence includes a notification of a route of the emergency service vehicle.

12. The method of claim 1, wherein the at least the second entity includes an entity without a computing device-based communication capability.

13. The method of claim 12, wherein the entity without the computing device-based communication capability comprises:
 a non-autonomous vehicle;
 a pedestrian;
 a cyclist; or
 an animal.

14. The method of claim 1, further comprising:
 detecting a presence of the plurality of entities.

15. The method of claim 14, wherein the plurality of entities is detected via at least one of:
 location reporting by the plurality of entities;
 detection of wireless signals from the plurality of entities; or
 light detection and ranging based identification of the plurality of entities.

16. The method of claim 1, wherein the processing system is a network-based processing system.

17. The method of claim 1, wherein the presenting further includes presenting information associated with the at least the first entity to the device of the emergency service vehicle.

18. The method of claim 1, wherein the processing system is deployed in the emergency service vehicle.

19. A non-transitory computer-readable medium storing instructions which, when executed by a processing system including at least one processor, cause the processing system to perform operations, the operations comprising:
 transmitting a notification of a presence of an emergency service vehicle to a plurality of entities;
 obtaining, from at least a first entity of the plurality of entities, at least a first acknowledgement of the presence of the emergency service vehicle;
 determining that at least a second acknowledgement is not obtained from at least a second entity of the plurality of entities;
 presenting information associated with the at least the second entity to a device of the emergency service vehicle, wherein the information includes a status of the at least the second entity with respect to the at least the second acknowledgement not being obtained from the at least the second entity; and
 establishing a communication between the processing system and at least one of: the at least the first entity or the at least the second entity.

20. An apparatus comprising:
 a processing system including at least one processor; and
 a non-transitory computer-readable medium storing instructions which, when executed by the processing system, cause the processing system to perform operations, the operations comprising:
  transmitting a notification of a presence of an emergency service vehicle to a plurality of entities;
  obtaining, from at least a first entity of the plurality of entities, at least a first acknowledgement of the presence of the emergency service vehicle;
  determining that at least a second acknowledgement is not obtained from at least a second entity of the plurality of entities;
  presenting information associated with the at least the second entity to a device of the emergency service vehicle, wherein the information includes a status of the at least the second entity with respect to the at least the second acknowledgement not being obtained from the at least the second entity; and
  establishing a communication between the processing system and at least one of: the at least the first entity or the at least the second entity.

* * * * *

UNITED STATES PATENT AND TRADEMARK OFFICE
CERTIFICATE OF CORRECTION

PATENT NO. : 11,887,476 B2
APPLICATION NO. : 17/505791
DATED : January 30, 2024
INVENTOR(S) : Ginger Chien et al.

Page 1 of 1

It is certified that error appears in the above-identified patent and that said Letters Patent is hereby corrected as shown below:

On the Title Page

Item [73] Assignee: delete "AT&T Intellect al Property I, L.P.," and insert --AT&T Intellectual Property I, L.P.--

Signed and Sealed this
Ninth Day of July, 2024

Katherine Kelly Vidal
*Director of the United States Patent and Trademark Office*